US009619755B2

United States Patent
Wang et al.

(10) Patent No.: US 9,619,755 B2
(45) Date of Patent: Apr. 11, 2017

(54) METHOD FOR ESTIMATING PARAMETERS OF A GRAPH SPECTRAL FILTER USING TRAINING DATA

(71) Applicant: Mitsubishi Electric Research Laboratories, Inc., Cambridge, MA (US)

(72) Inventors: Yongzhe Wang, Los Angeles, CA (US); Dong Tian, Boxborough, MA (US); Hassan Mansour, Cambridge, MA (US); Anthony Vetro, Arlington, MA (US); Antonio Ortega, Los Angeles, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 418 days.

(21) Appl. No.: 14/060,894

(22) Filed: Oct. 23, 2013

(65) Prior Publication Data

US 2015/0112897 A1    Apr. 23, 2015

(51) Int. Cl.
| | | |
|---|---|---|
| *G06T 5/20* | (2006.01) | |
| *G06N 99/00* | (2010.01) | |
| *G06T 7/40* | (2017.01) | |
| *G06K 9/46* | (2006.01) | |

(52) U.S. Cl.
CPC .......... *G06N 99/005* (2013.01); *G06K 9/469* (2013.01); *G06T 5/20* (2013.01); *G06T 7/403* (2013.01); *G06T 2207/20072* (2013.01); *G06T 2207/20081* (2013.01)

(58) Field of Classification Search
None
See application file for complete search history.

(56) References Cited

PUBLICATIONS

Sandryhaila12, Discrete Signal Processing on Graphs [online], Copyright (c) 2012 IEEE [retrieved on Aug. 24, 2015]. Retrieved from the Internet:<URL:http://www.google.com/url?sa=t&rct=j &q=&esrc=s&source=web&cd=10 &ved=0CGIQFjAJahUKEwi9yOmbl8HHAhXMVT4KHSD-APU &url=http%3A%2F%2Fusers.ece.cmu. edu%2F~asandryh%2Fpapers%2 Ftsp13.pdf>.*
D.I. Shuman, S.K. Narang, P. Frossard, A. Ortega, and P. Vandergheynst. The emerging field of signal processing on graphs: Extending highdimensional data analysis to networks and other irregular domains. Signal Processing Magazine, IEEE, 30(3):83-98, 2013.
Sunil K. Narang, Akshay Gadde, and Antonio Ortega. Signal processing techniques for interpolation in graph structured data. In IEEE International Conference on Acoustics, Speech and Signal Processing (ICASSP), May 2013.

(Continued)

*Primary Examiner* — Stanley K Hill
*Assistant Examiner* — Nathan Brown, Jr.
(74) *Attorney, Agent, or Firm* — Gene Vinokur; Hironori Tsukamoto; James McAleenan (57) ABSTRACT

A method processes a signal represented as a graph by first determining a graph spectral transform based on the graph. In a spectral domain, parameters of a graph filter are estimated using a training data set of unenhanced and corresponding enhanced signals. The graph filter is derived based on the graph spectral transform and the estimated graph filter parameters. Then, the signal is processed using the graph filter to produce an output signal. The processing can enhance signals such as images by denoising or interpolating missing samples.

17 Claims, 8 Drawing Sheets

(56) References Cited

PUBLICATIONS

Sunil K. Narang, Akshay Gadde, Eduard Sanou, and Antonio Ortega. Localized iterative methods for interpolation in graph structured data. To appear in 1st IEEE Global Conference on Signal and Information Processing (GlobalSIP), Dec. 2013.

Akshay Gadde, Sunil K. Narang, and Antonio Ortega. Bilateral filter: Graph spectral interpretation and extensions. ARVIX, Mar. 2013.

\* cited by examiner

METHOD FOR ESTIMATING PARAMETERS OF A GRAPH SPECTRAL FILTER USING TRAINING DATA

FIELD OF THE INVENTION

The invention relates generally to signal processing, and more particularly to estimating parameters of a graph spectral filter and processing a signal using such a graph-based filter,

BACKGROUND OF THE INVENTION

Graph-based signal processing merges algebraic and spectral graph theoretic concepts with computational harmonic analysis to process signal using graphs.

An undirected graph $G=(V, E)$ includes a set of nodes $V=\{1, 2, \ldots, N\}$ connected by a set of edges $E:\{(i,j,w_{ij})\}$, where $(i, j, w_{ij})$ the edge between nodes i and j having weights $w_{ij}$. An adjacency matrix W of the graph is an N×N matrix. A degree $d_i$ of a node i is a sum of edge weights connected to node i.

A degree matrix D is a diagonal matrix: $\text{diag}\{d_1, d_2, \ldots, d_N\}$. A combinatorial Laplacian matrix is $\mathcal{L}:=D-W$. The normalized Laplacian matrix $L:=D^{-1/2}\mathcal{L}D^{-1/2}$ is a symmetric positive semi-definite matrix. The matrix L has an eigendecomposition $L=U \Lambda U^t$, where $U^t$ is a graph Fourier transform $\{u_1, u_2, \ldots, u_N\}$ that is composed of an orthogonal set of eigenvectors, and $\Lambda=\text{diag}\{\lambda_1, \ldots \lambda_N\}$ is a corresponding eigenvalue matrix. In the above notation $U^t$, the superscript t indicated a transpose of the matrix U.

The eigenvectors and eigenvalues of the Laplacian matrix provide a spectral interpretation of signals represented by the graph. The eigenvalues can be treated as graph frequencies that are always in the interval [0,2] on a real line.

Graph Fourier transform (GFT) and Graph Spectral Filter (GSF)

A signal $\hat{x}$ is normalized as $x=D^{1/2}\hat{x}$. A graph Fourier transform (GFT) is defined as a projection of the normalized signal x onto the eigenvectors U of the graph:

$$\tilde{x}:=U^tx, \quad (1)$$

where $\tilde{x}$ are the GFT coefficients. The inverse transform is $$x:=U\tilde{x}, \quad (2)$$

The signal x is normalized because the eigenvector U is defined, over the normalized Laplacian matrix L. By definition, W, D and $\mathcal{L}$ can be regarded as operators over the unnormalized signal $\hat{x}$. The unnormalized signal $\hat{x}$ can also be processed as $$D^{1/2}LD^{1/2}\hat{x}=D^{1/2}U\Lambda U^t D^{1/2}\hat{x}=D^{1/2}U\Lambda(U^tx).$$

It is meaningful to analyze a transform by applying $U^t$ over the normalized signal x, which is the GFT. The normalizer $D^{1/2}$ is determined in the context of the graph G.

Normalization of an unnormalized signal is represented as $$x:=D^{1/2}\hat{x}, \quad (3)$$

and the denormalization is represented as $$\hat{x}:=D^{-1/2}x, \quad (4)$$

With the GSF and the inverse GSF, the signal x can be converted between a spatial domain and a graph spectral domain. The GSF is defined by the graph G, its adjacency matrix W, or the Laplacian matrix L.

As described later, any graph G has a corresponding filter design. Hence, a graph can be named by its corresponding filter name, e.g. bilateral graph filter refers to a graph with weights defined as bilateral coefficients.

Defining the graph does not change signal processing because it can be assumed as an equivalent representation of a conventional filter. However, with the GFT based on the graph G, a new spectral domain is defined. It is possible to perform the GST in the graph spectral domain as defined by $$\tilde{x}_{out}:=H_1(\Lambda)\tilde{x}_{in}, \quad (5)$$

where $H_1(\Lambda)=\text{diag}(h_1(\lambda_i))$. Or in another form:

$$\tilde{x}_{out}(\lambda_i):=h_i(\lambda_i)\tilde{x}_{in}(\lambda_i),$$

where $h_1(\lambda_i)$ can be a lowpass highpass or any other type of filter in the graph spectral domain.

Correspondingly, in the spatial domain, the GSF includes the GFT transform, the GSF filtering, and the inverse GFT transform as described below:

$$x_{out}=UH_1(\Lambda)U^tx_{in}:=H(\mathcal{L})x_{in}, \quad (7)$$

The filtering kernels in the spatial domain and spectral domain are linked as $$H(\mathcal{L})=UH_1(\Lambda)U^t \quad (8)$$

$$\text{or } H_1(\Lambda)=U^tH(\mathcal{L})U \quad (9)$$

In the above equations, the GSF and inverse GSF are defined over normalized signals. For unnormalized signals, the eigendecomposition may be performed over a combinatorial Laplacian matrix, which has different eigenvectors and eigenvalues.

Considerations for GSF Filter Design

The GSF can be used for image filtering and other applications. To apply graph based signal processing described above to design a graph based image filter, the following steps can be performed.

First, a graph is constructed. Then, a graph spectral filter $H_1$ is designed in terms of the graph. The design of the graph can use any known image filter F. For an input image $\hat{x}_{in}$, the output image $\hat{x}_{out}$ is a weighted average of pixels $$\hat{x}_{out}[j] = \sum_i \frac{w_{ij}}{\sum_i w_{ij}} \hat{x}_{in}[i], \quad (10)$$

where $w_{ij}$ are the weighting coefficients between pixel i and j. For example, a bilateral graph G has bilateral weights w defined by:

$$w_{ij} = \exp\left(-\frac{\|p_i - p_j\|^2}{2\sigma_s^2}\right)\exp\left(-\frac{(x_{in}[i] - x_{in}[j])^2}{2\sigma_r^2}\right).$$

The corresponding graph is defined as $G=(V, E)$ where the nodes V represent the pixels of the input image and the edges E represent the weighting (filtering) coefficients between two pixels i and j. The adjacency matrix W of the graph is $W=[w_{ij}]$. With these definitions, the degree matrix D, the combinatorial Laplacian matrix $\mathcal{L}$, the normalized Laplacian matrix L, the eigenvalue matrix $\Lambda$, and the eigenvalue matrix U can be determined.

Identity Graph Spectral Filter

In an identity graph spectral filter (iGSF), the signal is unchanged in the graph spectral domain. That is, the signal filtered by iGSF is $$\hat{x}_{out} = D^{-1}W\hat{x}_{in} \quad (11)$$

$$= D^{-\frac{1}{2}}\underline{D^{-\frac{1}{2}}WD^{-\frac{1}{2}}}D^{\frac{1}{2}}\hat{x}_{in} \quad (12)$$

$$= D^{-\frac{1}{2}}\underline{(I-L)}D^{\frac{1}{2}}\hat{x}_{in} \quad (13)$$

$$\Rightarrow D^{\frac{1}{2}}\hat{x}_{out} = \underline{(I-L)}D^{\frac{1}{2}}\hat{x}_{in}. \quad (14)$$

Eqn. (14) can be rewritten as $$x_{out} = (I-L)x_{in} \quad (15)$$

where $x_{in}$ is the normalized input image, and $x_{out}$ is the normalized output image, and I is an identity matrix.

The normalization can be used to define the image filtering in terms of the non-negative definite matrix L, and thus has a spectral interpretation. The normalization also ensures that a constant signal, when normalized, is an eigenvector of L associated with zero eigenvalue.

By comparing Eqn. (7) and Eqn. (15) H for an identity GSF can be represented as:

$$H = I - L \quad (16)$$

In the frequency domain, $H_1$ for the identity GSF can be represented as:

$$H_1 = U^t H U \quad (17)$$

$$= U^t(I-L)U \quad (18)$$

$$= U^t(I - U\Lambda U^t)U \quad (19)$$

$$= I - \Lambda \quad (20)$$

Figure 1:
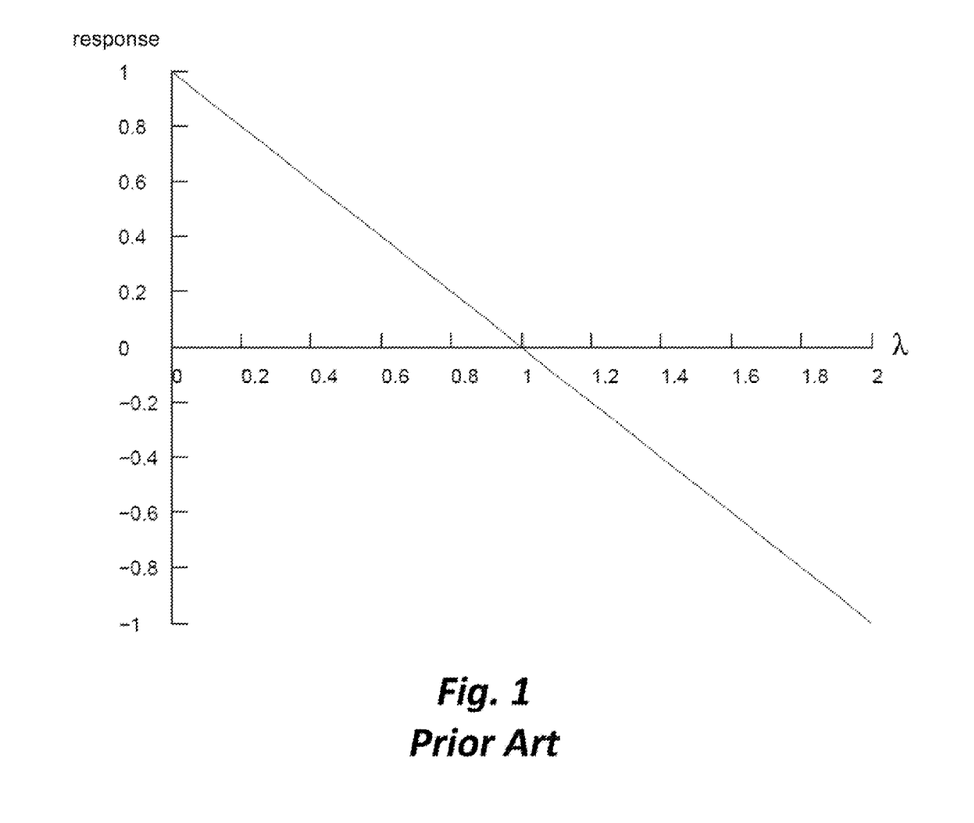
FIG. 1 is a graph of a spectral response of a conventional identity graph spectral filter.

As shown in FIG. 1, the above equation is the spectral response of an identity GSF as a function of eigenvalues $\lambda$.

In an example application used to describe the embodiments, the signals are images, for example, noisy images to be enhanced by reducing noise. Specifically, the noisy images can be depth images.

To better understand the identity GSF, $\hat{H}$ and $\hat{H}_1$ are detailed in the unnormalized domain:

$$\hat{H} = D^{-\frac{1}{2}}(I-L)D^{\frac{1}{2}} \quad (21)$$

$$= D^{-\frac{1}{2}}HD^{\frac{1}{2}} \quad (22)$$

$$\hat{H}_1 = U^t \hat{H} U \quad (23)$$

$$= U^t \left( D^{-\frac{1}{2}}(I-L)D^{\frac{1}{2}} \right) U \quad (24)$$

$$= U^t D^{-\frac{1}{2}}(I - U\Lambda U^t)D^{\frac{1}{2}}U \quad (25)$$

$$= U^t D^{-\frac{1}{2}}U(I-\Lambda)U^t D^{\frac{1}{2}}U \quad (26)$$

$$= \underbrace{U^t D^{-\frac{1}{2}}U}_{C} \underbrace{H_1}_{B} \underbrace{U^t D^{\frac{1}{2}}U}_{A} \quad (27)$$

From Eqn. (27), the filtering kernel in frequency domain is composed of three parts.

In Part. A, the spectral signal is first inverse transformed to the spatial domain such that the normalizer is applied and then transformed to spectral domain.

The signal fed to part B is in the spectral domain, and Part B is given by $H_1 = I - \Lambda$ in case of the iGSF. After filtering by $H_1$ in the graph-spectral domain, the spectral signal is then fed to Part. C.

Part C inverse trans onus to the spatial domain such that the denormalizer is applied and then transformed hack to frequency domain.

The design of the graph G is an important task, because $x_{out} = UH_1 U^t x_{in}$, U and $\Lambda$ are all determined by the selected graph G.

Following the graph selection, another issue is to design the GSF filter $H_1$ to satisfy requirements for particular applications. $H_1$ can be a lowpass, highpass or other types of filter. This disclosure addresses the filter parameter estimation problem for the GSF filter.

High-Pass Graph Filter

In a high-pass graph Filter, the graph filter H is used to extract high frequency components from an input image $x_{out} = Hx_{in} = UH_1 U^t x_{in}$.

Overview of Graph Based Interpolation

Conventional methods for interpolating signals defined on graphs include a method based on sampling theorem for bandlimited graph signals, and a method based on regularization.

Interpolation Based on Graph Sampling Theorem

In the sampling theorem method, data interpolation is formulated as a signal reconstruction problem on a graph, where a graph signal is defined as the information associated with each node, e.g., scalar or vector values mapped to the set of vertices and edges of the graph. In the graph sampling method, w stands for the weight between nodei and j. The known set is S, and the unknown set is $S^c = V - S$. A signal is bandlimited to the graph frequency band $[0, \omega)$ on a graph G when its GFT $U^t$ has support only at frequencies $[0, \omega)$. The space of $\omega$-bandlimited signals is called the Paley-Wiener space and is denoted by $PW_\omega(G)$, The partially known graph function can be formulated as a downsampled-upsampled (DU) signal. In a regular signal domain, the original signal is recovered from its DU signal by applying a low-pass filter. Similarly, in the graph domain, a low-pass filters can be designed to recover the original graph signal from the DU signal. An optimal cut-off frequency $\omega^*$ can be determined as $$\omega^* = \sigma_{min}, \quad (28)$$

where $\sigma^2_{min}$ is a smallest singular value of $(\mathcal{L}^2)_{S^c}$.

Given the cut-off frequency $\omega^*$, the reconstruction of the graph signal is done by a least-square (LS) projection of the corresponding DU signal onto the $PW_\omega(G)$ space. Let k be the number of eigenvalues of the Laplacian matrix $\mathcal{L}$ less than $\omega^*$.

The $\omega$-bandlimited signal can be written, under appropriate permutation, as:

$$x = \begin{bmatrix} x(S) \\ x(S^c) \end{bmatrix} = \begin{bmatrix} u_1(S) & u_2(S) & \ldots & u_k(S) \\ u_1(S^c) & u_2(S^c) & \ldots & u_k(S^c) \end{bmatrix} \begin{bmatrix} \alpha_1 \\ \alpha_2 \\ \vdots \\ \alpha_k \end{bmatrix} \quad (29)$$

Let $\alpha = [\alpha_1, \alpha_2, \ldots, \alpha_k]^t$, and $$\begin{bmatrix} u_1(S) & u_2(S) & \ldots & u_k(S) \\ u_1(S^c) & u_2(S^c) & \ldots & u_k(S^c) \end{bmatrix} = \begin{bmatrix} (U_k)_S \\ (U_k)_{S^c} \end{bmatrix} \quad (30)$$

where $U_k$ is the matrix containing the first k eigenvectors, and $(U_k)_S$ is the sub-matrix of $U_k$ containing rows corresponding to the set S. Then, $\alpha$ can be obtained by determining the least square solution to:

$$x(S) = (U_k)_S \alpha \quad (31)$$

That is, $$\alpha = (U_k)_S^\dagger x(S) \quad (32)$$

where † indicates a pseudo-inverse of the matrix.

Hence, the unknown signal values are $$x(S^c) = (U_k)_{S^c} \alpha \quad (33)$$

$$\Rightarrow x(S^c) = (U_k)_{S^c} (U_k)_S^\dagger x(S) \quad (34)$$

Interpolation Based on Regularization

In the regularization method, the data interpolation is formulated as a regularization problem $$\hat{x} = \underset{x}{\operatorname{argmin}} \underbrace{\|J(x_{du} - x)\|^2}_{A} + \underbrace{\rho\|Hx\|^2}_{B} \quad (35)$$

where $J: \mathbb{R}^N \to \mathbb{R}^M$ denotes a downsampling operator. M is a size of an known subset of samples, and N is a size of a full set of samples. J can be represented by an appropriate permutation:

$$J_{M \times N} = (I_{M \times M} | 0_{M \times (N-M)})_{M \times N} \quad (36)$$

and $x_{du}$ can be in the following form with appropriate permutation $$x_{du} = [x(S)^t, 0(S^c)^t]^t,$$

Then, H is a high pass regularization graph filter. Part A in equation 35 is a data-fitting term that determines the error between the reconstructed signal and the original signal at the known samples, and part B is the Euclidean norm of the output of a highpass graph filter H.

The solution is $$\hat{x} = (J^t J + \rho H^t H)^{-1} x_{du} \quad (37)$$

$$= U(U^t J^t J U + \rho H_1^t H_1)^{-1} U^t x_{du} \quad (38)$$

Iterative methods can be used to solve the least square problem at a reduced complexity.

SUMMARY OF THE INVENTION

Given an underlying graph constructed for a signal as well as a data set of unenhanced and corresponding enhanced training signals, a graph spectral filter is estimated in the spectral domain. A key realization for designing an appropriate graph filter is to determine an optimal graph spectral filter (GSF).

Instead of using ad-hoc selection methods, the embodiments of the invention estimate the filter parameters by formulating the filter design as a solution to a least square (LS) problem. In an application where training data are available, the method provides a numerical way to estimate the optimal GSF filter.

DETAILED DESCRIPTION OF THE PREFERRED EMBODIMENTS

The embodiments of the invention provide methods for processing a signal using a graph spectral filter (GSF).

In an example application used to describe the embodiments, the signals are images, for example, noisy images to be enhanced by reducing noise. Specifically, the noisy images can be depth images.

The invention can be used for applications such as image and video processing, and for signal processing in social, energy, transportation, sensor, or neural networks, where high-dimensional data naturally can be represented as vertices of weighted graphs. The invention can also be used to process epidemiological, census, logistics, and medical data.

As described above, the design of a filter H or a functional $f(H)$ for a signal represented as a graph, equivalently g(U, $H_1$)) includes two phases. In a first phase, a graph transform domain is selected, based on the graph G for the signal to be processed, and a graph spectral filter (GSF) filter $H_1$ is designed in the graph spectral domain using training data. We assume that the graph G is predetermined.

The embodiments of our invention estimate parameters $H_1$ for the. GSF filter using training, data. The parameters are used to design the graph filter. Though there are many known filter designs that can be used, the selection is based on certain assumptions, e.g., the signal has certain properties or follows a particular distribution, which makes the selection difficult in practice.

Method Overview

Figure 2:
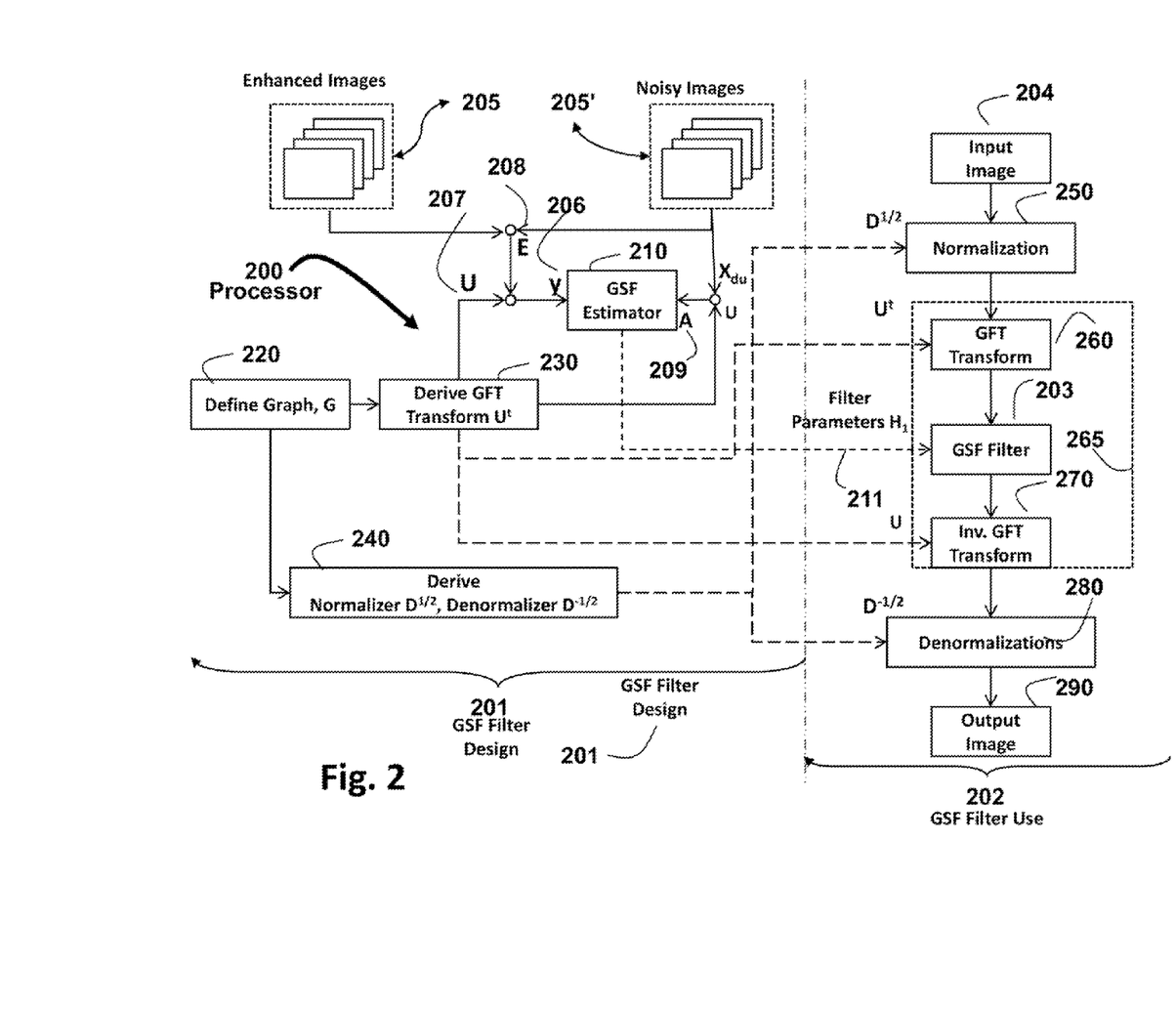
FIGS. 2 and 3 are flow diagrams of processing a signal using a graph according to embodiments of the invention.

FIG. 2 shows one embodiment of the invention. The embodiment includes GSF design 201 and GSF use 202. The steps shown can be performed in a processing device connected to memory and input/output interfaces by buses as known in the art.

Training

It is noted that training data are available for sonic applications. In this case, the selection, is simpler. For example, in a 3D video compression system, noise in depth images can come from down-upsampling due to a mixed resolution coding. If enhanced depth images, before encoding, are available along with the reconstructed depth images, then it is possible to form training data and use the images to train the parameters of the graph filter. Subsequently, the estimated graph filter can be used to denoise the depth images at a decoder without having access to the original depth images.

The embodiments of the invention provide a method for estimating the graph filter H or a GSF filter $H_1$. It should be understood that the invention can be applied to other graph-based signal processing applications.

Training data includes M image pairs, each image has N=Width×Height pixels. Each image pair includes a noisy image 212 and a corresponding enhanced (denoised or clean) image 211. The filter design is formulated as determining an optimal graph filter:

$$\dot{H} = \underset{H}{\operatorname{argmin}} \|E_{N \times M} - HX_{du, N \times M}\|^2 \quad (39)$$

where $$X_{du} = \{x_{du,1}^t, x_{du,2}^t, \ldots, x_{du,M}^t\}^t$$

represents the noisy training images in columnar form (after down and upsampling (du)), and E represents the errors between the noisy images and the enhanced images.

Given a graph 220, e.g., a bilateral filter or a joint bilateral filter, the graph transform $U^t$ is known. Inserting Eqn. (8) into Eqn. (39) is equivalently to determining a best $H_1$:

$$\dot{H}_1 = \underset{H_1}{\operatorname{argmin}} \|E - UH_1 U^t X_{du}\|^2 \quad (40)$$

$$\Longleftrightarrow \dot{H}_1 = \underset{H_1}{\operatorname{argmin}} \|U^t E - H_1 U^t X_{du}\|^2 \quad (41)$$

$$\Longleftrightarrow \dot{H}_1 = \underset{H_1}{\operatorname{argmin}} \|E^t U - X_{du}^t U H_1\|^2 \quad (42)$$

where $H_1$ is the GSF filter in the graph spectral domain. The filter can be estimated from the training data set by solving the least square (LS) problem.

Because $H_1$ is a diagonal matrix, we vectorize the martix as $$h_1 = \{h(\lambda_1), h(\lambda_2), \ldots, h(\lambda_N)\}$$

so that a conventional least square solution can be used. For this purpose, the columns of $E^tU$ are stacked, and a vector y is $$y = \{y_1^t, y_2^t, \ldots, y_N^t\}^t \quad (43)$$

Similarly, the columns of $X^t_{du}U$ are used to define a matrix A with (M×N) rows and N columns.

$$A = \operatorname{diag}\{\alpha_1, \alpha_2, \ldots, \alpha_N\} \quad (44)$$

With this notation, Eqn. (42) can be written as $$\dot{h}_1 = \underset{h_1}{\operatorname{argmin}} \|y - Ah_1\|^2 \quad (45)$$

with a solution $$\dot{h}_1 = A^\dagger y \quad (46)$$

where † represents the pseudo-inverse. Thus, we formulate the filter estimation problem in Eqn. (39) and (42) with a solution provided by Eqn. (46), Filtering Method The method is shown in the FIG. 2. The method has the one time (off line) training phase 201, and the real-time operating (use) phase 202.

Training

During training, die method first estimates 210 the graph spectral filter (GSF) 203 as follows.

Step 1: A graph G is defined 220 heuristically for an input signal 204.

Step 2: Next, we derive 230 the graph Fourier transform (GFT) $U^t$, where $U^t$ is an orthogonal set of eigenvectors of the corresponding normalized Laplacian matrix L. The GFT transform is an input for the estimation 210.

Step 3: A normalizer/denormalizer $D^{1/2}$ and $D^{-1/2}$ are derived 240.

Step 4: For each training pair of images, e.g., an enhanced image 205 and a noisy image 205', an error signal E is obtained as a function of the image pairs, e.g. the difference image of the image pair, or simply just the enhanced images.

Step 5: A signal y 206 is obtained as a function of signal U 207 and F. 208.

Step 6: A signal A 209 is obtained as a function of signal U and the noisy training image 205'.

Step 7: Given signals y and A as inputs, the GSF filter parameters 211 are estimated by the GSF estimator 210 module using, e.g., a least square procedure.

Then, all the parameters for the modules used during the real time operation as shown on the left of FIG. 2, when the filter is used, can be set accordingly.

Operation

During operation 202 the GSF 203 is used as follows.

Step 1: Provide an input image 204 to filtered or enhanced by the GSF filter 203.

Step 2: Perform normalization 250 on the input image using Eqn, (3).

Step 3: Perform a GFT transform 260 on the normalized input image using Eqn (1). The image obtained in the transform domain is provided as input for the next step.

Step 4: Conduct GSF filtering using the estimated parameters $H_1$ of the filter 203.

Step 5: Perform an inverse GFT (iGSF) transform 270 on the filtered image in GFT transform domain using Eqn. (2).

Step 6: Perform denormalization 280 using Eqn. (4).

Step 7: Output 290 the processed image.

In the above, steps 3, 4, and 5 (260, 203, 270) constitute the graph filter H 265 as described above.

Normalization/Denormalization

In another implementation of graph based filtering, the GFT $U^t$ is based on the combinatorial Laplacian matrix $\mathcal{L}$, instead, the filtering based on the normalized Laplacian L. In this case, the normalizes and denormalizer are an identity I, or equivalently, the not and denormalization modules are skipped in this case.

Iteration

The invention is not limited to use a closed solution to an LS solution. In a practical application, an iterative solution of the least squares problem may be preferred.

Image Block Classifying

Figure 4:
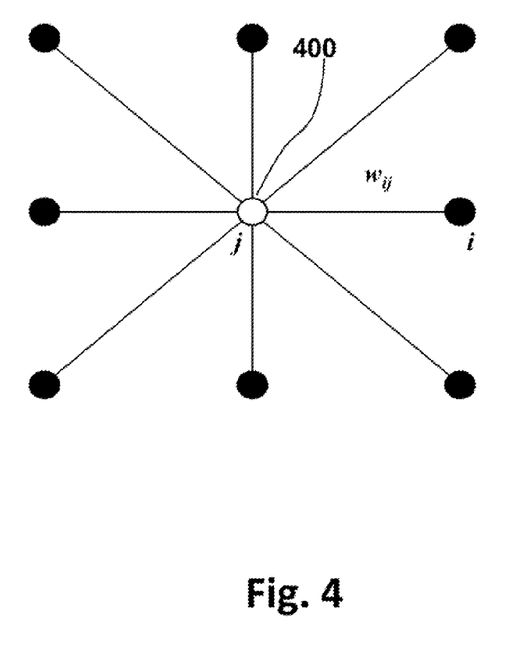
FIG. 4 is a pixel level star graph used by embodiments of the invention.

It may be suboptimal to use a single filter parameter set for all images. Hence, we can classify image blocks into different defined categories, e.g., a block with a "flat" texture or an edge. Then, each category can be associated with one parameter set. Each category maintains one set of parameters for the GSF filter, High-pass Bilateral Graph Filter In one embodiment, the graph filter H is used to extract high frequency components from an input image $x_{out} = Hx_{in} = UH_1 U^t x_{in}$. As done in the prior art, the graph G is based on a bilateral filter (BF) with a "star" structure of the graph as shown in FIG. 4 with nodes i and j and weighted edge $w_{i,j}$. This graph can he used to filter the central pixel 400.

The parameters of the high-pass GSF filter $H_1$ can be estimated using the GSF design according to this invention. In the training data set, the enhanced images 205 are the enhanced versions without high frequency components. The error signal E is set equal to the difference image between the input image and enhanced image. Then Eqn. (46) can he used to solve the parameter estimation for the graph fiber, Low-Pass Bilateral Graph Filter Similarly, a low-pass bilateral graph filter can be estimated if the error signal E is the enhanced image rather the difference image.

High-Pass Joint Bilateral Graph Filter (JBF)

In this embodiment, errors in a noisy depth image, e.g. due to coding artifacts, are filtered. In contrast to the bilateral filter, the weights of the joint bilateral filter are determined from a guidance image $\tilde{I}$, e.g., a corresponding texture image. The weights can be represented by Eqn. (47), with $x_{in}$ replaced by $$w_{ij} = \exp\left(-\frac{\|p_i - p_j\|^2}{2\sigma_s^2}\right)\exp\left(-\frac{(\tilde{I}[i] - \tilde{I}[j])^2}{2\sigma_r^2}\right) \quad (48)$$

Similar to the high-pass bilateral graph filter, our GSF design is applied to estimate the parameters of GSF filter $H_1$ to filter the noisy depth. The training data set is composed of noisy depth images and enhanced depth images. The error signal E is a difference depth image between the noisy depth and enhanced depth. Eqn. (46) is then used to estimate the parameter for the graph filter.

Filter for Depth Denoising Based on Regularization

In this embodiment, the graph filter is used to denoise an image. This problem can be formulated as a regularization problem:

$$\hat{x} = \underset{x}{\operatorname{argmin}} \underbrace{\|x_{du} - x\|^2}_{A} + \underbrace{\rho\|Hx\|^2}_{B} \quad (49)$$

where $x_{du}$ is a noisy image. H is a regularization kernel that is designed as a high-pass graph filter with the underlying graph being a joint bilateral as in Eqn. (48). That is, the weights of the graph are determined from the corresponding texture image.

In Eqn. (49), part A determines the error between the noisy depth and the filtered depth image. Part B is the Euclidean norm of the output of a high pass filter H. Parameter $\rho$ is predetermined, e.g. $\rho = \rho_0$ to control the weights between the parts A and B. The solution, in closed form, is $$\hat{x} = (I + \rho H^T H)^{-1} x_{du} \quad (50)$$

The design of H (or $H_1$) is as for the high-pass joint bilateral filter described above, and the resulted filter $(I + \rho H^T H)^{-1}$ is referred as a graph-based joint-bilateral filter (GB-JBF).

Figure 3:
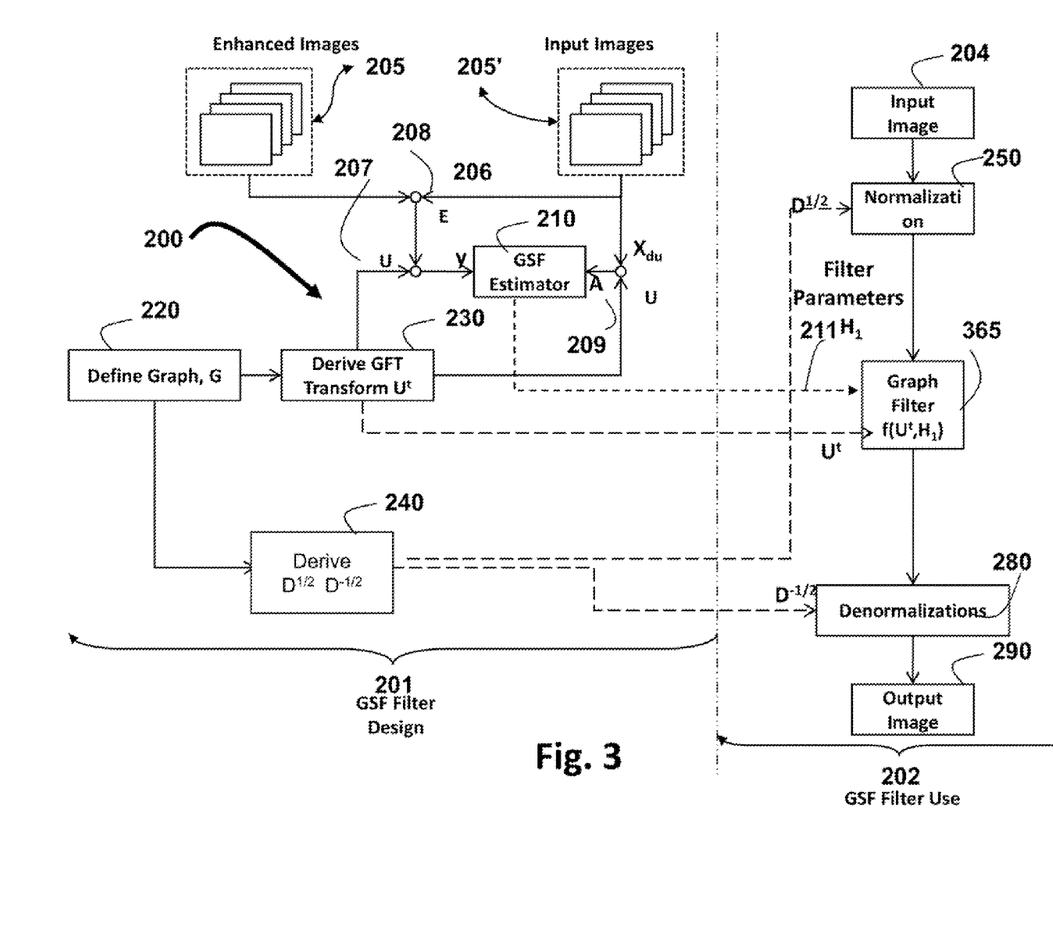

FIG. 3 shows the correspondingly block diagram where the graph filter 265 of FIG. 2 is replaced by a more general filter module $f(U^T, H_1)$ 365, which is specified by a function of the graph transform and GSF filter, i.e., the GB-JBF filter.

Figure 5:
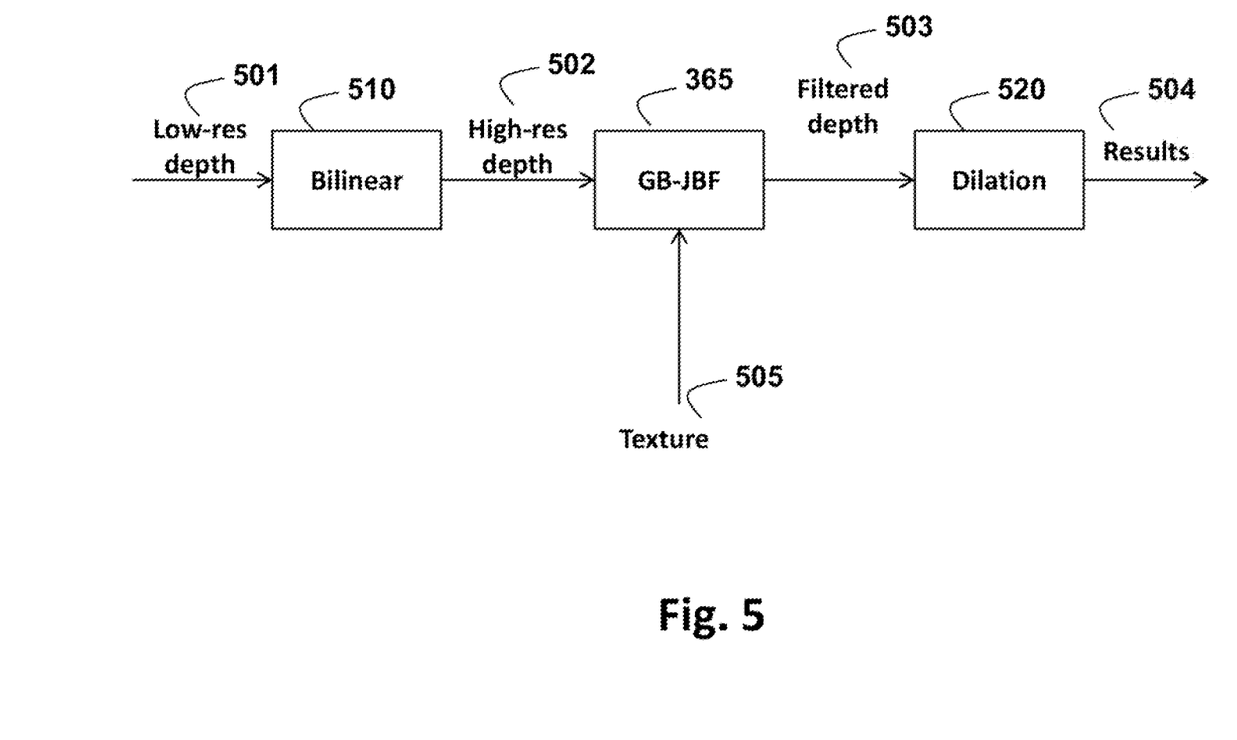
FIGS. 5 and 6 are a block diagram of a 3D video system using the filtering according to embodiments of the invention.

For an example of 3D video system, as shown in FIG. 5, the depth map 501 can be coded at a low resolution, which is first upsampled by a bilinear filter 510. The upsampled high resolution depth images 502 and a guidance texture image 505 are used as inputs to the GB-JBF block 365 to remove noise from the coding scheme. The filtered depth map 503 is dilated 520 using a dilation filter before performing view synthesis to yield the high resolution depth image 504. Note that the bilinear filter is an example filter to do upsampling, and other upsampling filters can be selected, for the initial processing. In addition, the dilation filter is an optional post processing step.

Sealing Parameter $\rho$

It is noted that the scaling parameter $\rho$ in Eqn. (49) may be difficult to determine because it does directly have a physical meaning. One way to avoid setting $\rho$ is to solve the following similar problem:

$$\hat{x} = \underset{x}{\operatorname{argmin}} \|Hx\|^2, \quad (51)$$
$$\text{s.t. } \|x_{du} - x\|^2 < \delta$$

With this formation, parameter $\delta$ has a clear physical meaning that represents the changes made on the signals that can be tolerated.

GB-JBU Upsampling Based on Regularization

Figure 6:
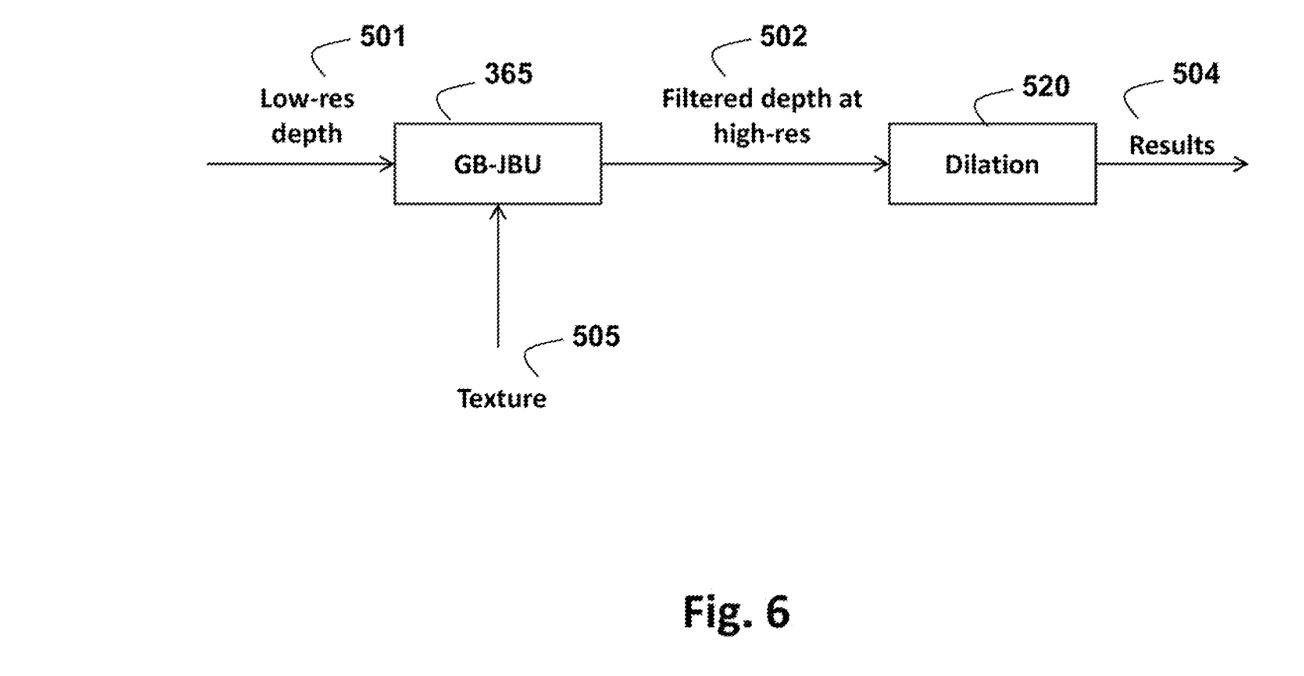

In another embodiment as shown in FIG. 6, when the input is depth image 501 has a low resolution, the graph filter $f(U^T H_1)$ 365 can be directly designed to perform upsampling while reducing noise. The regularization problem can be formulated as Eqn. (35), and its solution is given in Eqn. (37). The underlying joint bilateral graph is given as per Eqn. (48). We can also use $H_1$ and the resulted filter $(J^T J + \rho H^T H)^{-1}$ is referred as GB-JBU hereinafter. FIG. 3 shows this embodiment with the "graph filter" being GB-JBU 365, which replaces block 265 in FIG. 2.

Pixel-level Method vs. Block-level Method

In this embodiment, two methods are described for different graphs, namely pixel-level and block-level methods. For the pixel-level method as shown in FIG. 4, one graph is constructed for each missing sample (pixel). For example, in each star graph, is a star graph, the missing sample 400 is at the center. The center pixel is connected to nodes corresponding to known samples or pixels within a predetermined distance. Thus, each missing pixel in the image is associated with one graph, and hence the pixels are interpolated one by one.

Figure 7:
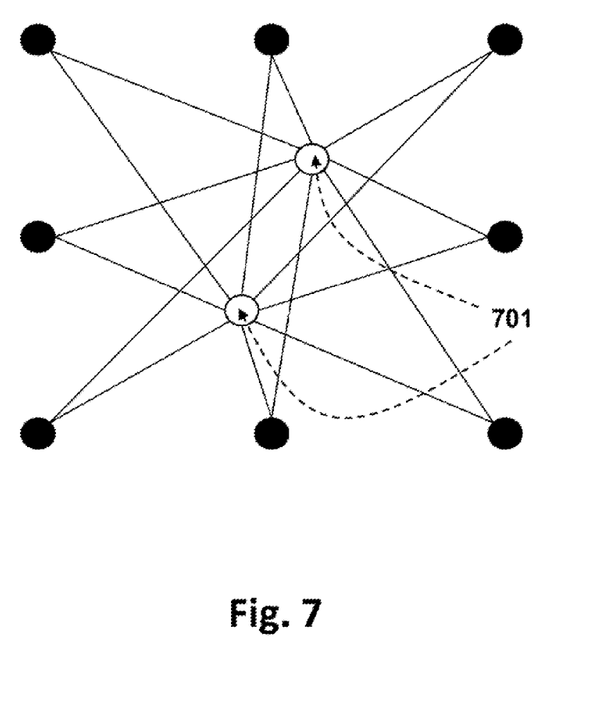
FIG. 7 is an example block level graph with two missing samples used by embodiments of the invention.

For the block-level method, the entire image is partitioned into non-overlapping patches and all missing samples in a patch are linked to other known samples (pixels) within a predetermined distance, and a single graph is constructed for all missing samples (pixels) Within one graph, FIG. 7 shows one example graph with two missing samples 701 in the image patch. All missing samples are connected to all known samples within the same patch.

Figure 8:
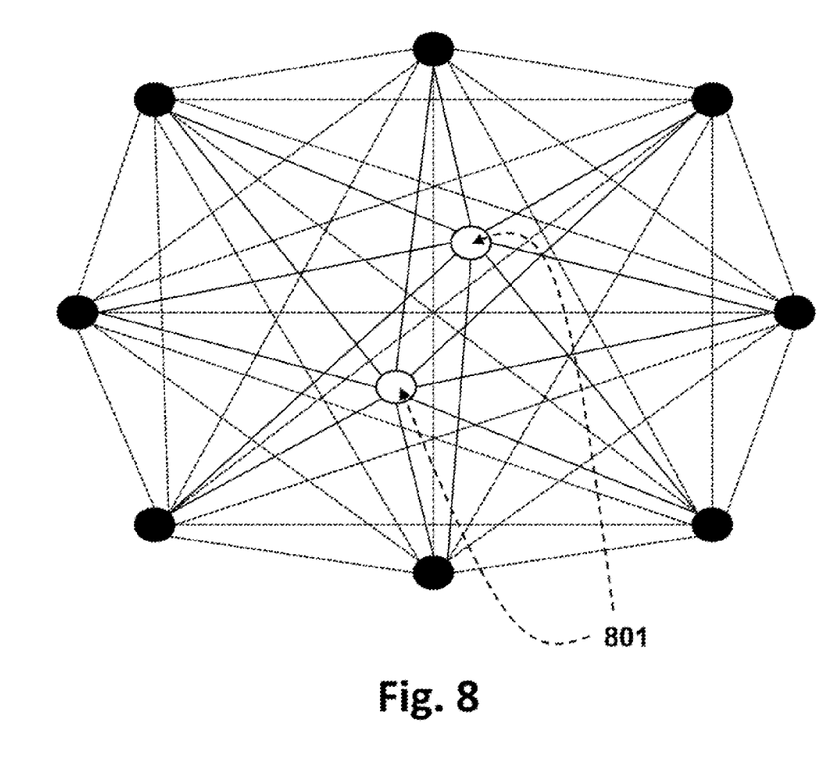
FIG. 8 is another example block level graph with two missing samples used by embodiments of the invention.

FIG. 8 shows another example graph, where all samples are connected, and even the known samples are connected to each other. With such a graph constructed for each image block, all missing samples 801 in a same image patch can he interpolated simultaneously.

Parameter $\rho$

Similar to Eqn. (51), one way to avoid setting $\delta$ is to solve the following similar problem:

$$\hat{x} = \underset{x}{\operatorname{argmin}} \|Hx\|^2, \quad (52)$$
$$\text{s.t. } \|J(x_{du} - x)\|^2 < \delta$$

With this formation, parameter $\rho$ has a clear physical meaning that represents the changes made on the known samples that can be tolerated.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for processing an input signal represented as a graph, comprising:
   employing a processor executing computer executable instructions stored on a computer readable memory to facilitate performing the steps of:
   acquiring the input signal, wherein the input signal is an image that is an unenhanced image including noise;
   acquiring a training data set, wherein the training data set includes pairs of training signals, wherein each pair of training signals includes an unenhanced training signal with noise and a corresponding enhanced training signal with reduced noise, and wherein the training signals are in a form of images;
   determining a graph spectral transform as an orthogonal set of eigenvectors based on the graph, wherein the graph includes vertices connected by edges having associated weights, and wherein the weights are based on a guidance signal in a form of a guidance texture image;
   estimating, in a graph spectral domain, parameters of a graph filter based on the training data set;
   deriving the graph filter based on the graph spectral transform and the graph filter parameters; and
   processing the input image using the graph filter to produce an output image, wherein the output image is an enhanced image with reduced noise that provides an increased understanding of a displayed image over an unenhanced displayed image with noise.

2. The method of claim 1, wherein the estimating uses a least square procedure.

3. The method of claim 2, wherein the least square procedure comprises:
   obtaining an error image E from the pairs of training signals;
   generating a image y based on the graph spectral transform $U^t$ and the error image E;
   generating a matrix A from the training signals and the graph spectral transform $U^t$; and
   estimating $H_1$ $A^\dagger y$, where $\dagger$ represents a pseudo-inverse of the matrix A.

4. The method of claim 3, wherein the error image E is a difference between the enhanced image and the corresponding unenhanced images.

5. The method of claim 3, wherein the error image E is the enhanced image.

6. The method of claim 1, wherein the graph filter is H or $UH_1U^t$, where $U^t$ is the graph spectral transform.

7. The method of claim 1, wherein the weights are joint bilateral weights.

8. The method of claim 1, wherein the signal is a depth image, the guidance signal is a corresponding texture image of samples, and the weights are derived from a spatial distance between two samples and an intensity difference of two collocated samples in the corresponding texture image.

9. The method of claim 1, wherein processing removes noise from the signal, and further comprising:
   setting a scaling parameter $\rho$ to a predetermined value $\rho_0$; and
   constructing the graph filter as $(I+\rho H^t H)^{-1}$, wherein I is an identity matrix.

10. The method of claim 1, wherein the processing interpolates the signal, and further comprises:
    setting a scaling parameter $\rho$ to a predetermined value $\rho_0$; and
    constructing the graph filter as $(J^t J + \rho H^t H)^{-1}$, where
    $$J_{(m \times N)} = (I_{(M \times N)} | 0_{(M \times (N-M))}),$$
    where I is an identity matrix, M represents a number of known samples, and N a number of all samples.

11. The method of claim 1, wherein the processing interpolates missing samples in the signal, and further comprising:
    constructing the graph for each missing sample;
    estimating the graph filter based on the graph for each missing sample to produce an estimated graph filter;
    deriving the graph filter using the estimated graph filter to produce a derived graph filter; and
    interpolating the missing sample using the derived graph filter.

12. The method of claim 11, wherein the constructing of the graph comprises:
    selecting known samples near to the missing sample; and
    linking the missing sample to all known samples.

13. The method of claim 1, wherein the processing interpolates missing samples in the signal, and further comprising:
    partitioning the signal into non-overlapping patches;
    constructing the graph for each patch;
    estimating, for each patch, the graph filter based on the graph for the patch to produce an estimated graph filter;
    deriving the graph filter using the estimated graph filter for each patch to produce a derived graph filter; and
    interpolating the missing samples using the derived graph filters.

14. The method of claim 13, wherein the graph is constructed by linking each missing sample to all known samples within the patch.

15. The method of claim 14, wherein the graph has links between known samples.

16. The method of claim 1, further comprising:
    defining categories of the signal; and
    estimating, for each category, the filter parameters $H_1$ of the graph filter to classify the signal as one of the categories.

17. The method of claim 16, wherein the signal is an image including blocks, and classifying each block by detecting whether the block includes edges or a flat texture.

* * * * *